(12) United States Patent
Hu et al.

(10) Patent No.: US 8,675,287 B2
(45) Date of Patent: Mar. 18, 2014

(54) PIEZOELECTRIC DRIVING MODULE FOR LENS

(75) Inventors: Chao Chang Hu, Taoyuan County (TW); Shu Shan Chen, Taoyuan County (TW)

(73) Assignee: TDK Taiwan Corp. (TW)

( * ) Notice: Subject to any disclaimer, the term of this patent is extended or adjusted under 35 U.S.C. 154(b) by 0 days.

(21) Appl. No.: 13/373,466

(22) Filed: Nov. 14, 2011

(65) Prior Publication Data
US 2013/0120855 A1    May 16, 2013

(51) Int. Cl.
*G02B 15/14*    (2006.01)
*G02B 7/02*    (2006.01)

(52) U.S. Cl.
USPC ........................................ 359/696; 359/824

(58) Field of Classification Search
USPC ................ 359/694–704, 811–830; 310/311, 310/320–324
See application file for complete search history.

(56) References Cited

U.S. PATENT DOCUMENTS

| | | | |
|---|---|---|---|
| 7,826,734 B2* | 11/2010 | Shirono et al. | 396/85 |
| 8,405,921 B2* | 3/2013 | Ko et al. | 359/824 |
| 2003/0006675 A1* | 1/2003 | Bartzke et al. | 310/328 |

* cited by examiner

*Primary Examiner* — Mohammed Hasan

(57) ABSTRACT

A piezoelectric driving module for lens, which defines a photographic optical axis and includes a housing, a driven object (e.g., a lens module), a piezo member, and a rubbing element. The piezo member and the rubbing element are provided in the housing and located on two lateral sides of the driven object respectively. The piezo member drives the driven object by friction so that the driven object can be moved along the photographic optical axis until focused. Meanwhile, a predetermined frictional force is generated between the rubbing element and the driven object to reduce a gravity-induced speed difference between forward and backward movements of the driven object along the photographic optical axis.

8 Claims, 8 Drawing Sheets

PIEZOELECTRIC DRIVING MODULE FOR LENS

BACKGROUND OF THE INVENTION

1. Field of the Invention

The present invention relates to a lens driving module and, more particularly, to a piezoelectric driving module with a piezoelectric motor for driving a lens module, wherein the lens module, when so driven during a zooming or focusing process, is rubbed against a rubbing element so that a predetermined frictional force is generated therebetween to reduce a gravity-induced speed difference of the lens module.

2. Description of the Prior Art

Please refer to FIG. 1 for an exploded perspective view of a conventional focusing lens unit which includes a focusing mechanism 9 based on mechanical transmission. In order to drive the supporting seat 93 mounted with the lens set 92, the focusing mechanism 9 uses a costly precision driving element 91 (e.g., a step motor, a supersonic motor, etc.) and a large number of transmission elements. These driving and transmission elements not only increase the size, complexity, and cost of the entire mechanical structure, but also lead to a complicated assembly process, high power consumption, and consequently a high selling price.

With the continuous advancement of technology, the traditional photographic devices are being constantly improved in terms of image quality and compactness, so as to meet the diversified needs in the information age. For instance, the conventional step motors are being replaced by voice-coil motor (VCM)-based or piezoelectric motor-based drivers to further downsize the driving structure. In addition, there is a trend to integrate the functions of different products. The picture-taking function, for example, has been incorporated into mobiles phones, personal digital assistants (PDAs), and laptop computers to provide these products with more powerful visual image functionalities.

A piezoelectric motor is made of a piezoelectric material. When subjected to an applied voltage, a piezoelectric motor can generate an actuating force suitable for displacing a lens module to be focused or zoomed. More particularly, a piezoelectric motor produces a piezoelectric effect, which is a reversible process and can be divided into a "direct piezoelectric effect", which refers to the generation of voltage by the piezoelectric motor due to a volume change of the motor material, and a "converse piezoelectric effect", which refers to a volume change of the motor material triggered by an applied voltage. All materials exhibiting the aforesaid piezoelectric effects are called "piezoelectric materials". In addition to quartz, tourmaline, Rochelle salt (potassium sodium tartrate), and like natural crystals, piezoelectric materials include those synthetically produced in the form of zinc oxide, polymers, ceramics, and composite materials. Piezoelectric ceramic is currently the mainstream of piezo members because of its small volume, fast response, small displacement, and low power consumption. More advantageously, piezoelectric ceramic is easy to manufacture, can be made into almost any shape, and shows a diversity of properties that vary with its composition.

As a piezoelectric motor twists in a wavy manner under an applied voltage and drives a lens module by friction, the actuating force (i.e., frictional force) between the piezoelectric motor and the lens module is not constant during the driving process but has a magnitude that fluctuates rapidly and repeatedly like a wave. Therefore, while the lens module is displaced vertically up and down, the force of gravity acting on the lens module plays a more prominent role in moments when the actuating force of the piezoelectric motor is relatively small. As a result, a speed difference occurs when the lens module is moved back and forth in a zooming or focusing process. More specifically, the piezoelectric motor tends to move slower when driving the lens module vertically upward than when driving the lens module vertically downward, for the piezoelectric motor has to overcome the force of gravity acting on the lens module. Experiment results show that, given the same applied voltage and other operating conditions, the ratio between the speed at which a piezoelectric motor drives a lens module upward (or forward when the lens module faces upward) and the speed at which the piezoelectric motor drives the lens module downward (or backward when the lens module faces upward) can be as high as 1:1.7. Such a large speed difference increases not only the difficulty in precisely controlling the position of the lens module, but also the circuit complexity and cost of the positioning module employed.

SUMMARY OF INVENTION

The primary objective of the present invention is to provide a piezoelectric driving module for lens, wherein a piezo member is provided on a housing and configured for driving a lens module into axial movement within the housing, and wherein a predetermined frictional force generated between a rubbing element and the lens module helps reduce a gravity-induced speed difference of the lens module while the lens module is being zoomed or focused.

In order to achieve the above mentioned objective, the present invention discloses a piezoelectric driving module for lens, which defines a photographic optical axis and comprises: a housing having a receiving space therein, a driven object received in the receiving space, at least a piezo member provided on the housing and adjacent to a first lateral surface of the driven object, and a rubbing element provided on the housing and adjacent to a second lateral surface of the driven object. The second lateral surface may or may not coincide with the first lateral surface, and the photographic optical axis is parallel to the first lateral surface and the second lateral surface. When a voltage is applied to the at least a piezo member, the at least a piezo member drives the driven object to move along the photographic optical axis such that a predetermined frictional force is generated between the rubbing element and the driven object to reduce a speed difference of the driven object that results from a force of gravity acting on the driven object while the driven object is moved.

In a preferred embodiment, a ratio of speeds at which the driven object is moved in one direction and an opposite direction of the photographic optical axis respectively is controlled to be within 1:1.3.

In a preferred embodiment, each said piezo member is a piezoelectric motor, and the driven object is a lens module selected from the group consisting of a zoom lens module and a focusing lens module.

In a preferred embodiment, the piezoelectric driving module further comprises at least a position detection module, wherein the at least a position detection module is provided on the housing and configured for detecting an extent to which the driven object is moved along the photographic optical axis.

In a preferred embodiment, the piezoelectric driving module further comprises: a pre-pressing element provided on the housing so as to apply a pre-pressing force to the at least a piezo member and thereby keep the at least a piezo member in contact with the driven object; and a cover for positioning the driven object in the receiving space and limiting a position of the pre-pressing element with respect to the housing.

In a preferred embodiment, the piezoelectric driving module further comprises: a guiding mechanism connected to the driven object, located in the receiving space, and configured for guiding the driven object along the photographic optical axis, wherein the guiding mechanism comprises one of a guide post and a guide rail.

In a preferred embodiment, the pre-pressing element is a metal plate provided behind the at least a piezo member, and the pre-pressing element has two end portions each provided with a resilient member, the two resilient members being respectively and resiliently fitted in two recesses on an outer lateral surface of the housing so as for the pre-pressing element to apply a predetermined pressing force to a back of the at least a piezo member to ensure constant contact between the at least a piezo member and the driven object.

In a preferred embodiment, the piezoelectric driving module further comprises: a friction element provided on the driven object so that at least a piezo member and the rubbing element can rub against the friction element.

In a preferred embodiment, the friction element is cylindrical, is secured in a connecting groove of the driven object by adhesive bonding, is movable along a slide rail formed as a semicircular groove on an inner periphery of the housing so as to move linearly along the photographic optical axis in synchronization with the driven object, and is in contact with the at least a piezo member and the rubbing element.

In a preferred embodiment, the friction element is made of metal or ceramic, is bonded to an inner periphery of the housing, is located on a lateral side of the at least a piezo member, and is in contact with the rubbing element so as to generate the predetermined frictional force.

BRIEF DESCRIPTION OF THE DRAWINGS

The structure as well as a preferred mode of use and advantages of the present invention will be best understood by referring to the following detailed description of some illustrative embodiments in conjunction with the accompanying drawings, in which.

DESCRIPTION OF THE PREFERRED EMBODIMENT

Herein, a piezo member refers to a component formed of a piezoelectric material whose converse piezoelectric effect is put to practical use. More specifically, a voltage is applied to the piezoelectric material of a piezo member to deform and hence cause displacement of the piezoelectric material. The movement of a strained piezoelectric material can be generally divided into: 1. linear longitudinal movement, which is typical of single-plate or laminated piezo members; and 2. curved lateral movement, which is typical of unimorphs and bimorphs. Piezo members designed for linear longitudinal movement advantageously feature high rigidity and a large axial pushing force, while those designed for curved lateral movement provide relatively large displacements.

The piezo member used in the piezoelectric driving module for lens of the present invention is an actuating element generally known as a piezoelectric motor. The piezoelectric motor in the present invention is formed of a piezoelectric material so that, when a voltage is applied thereto, the piezoelectric motor generates an actuating force for displacing a lens module to a photographically optimal position. As the piezoelectric motor can be selected from commercially available products and is not a major technical feature of the present invention, a detailed description of the structure of the piezoelectric motor is omitted herein.

Figure 1:
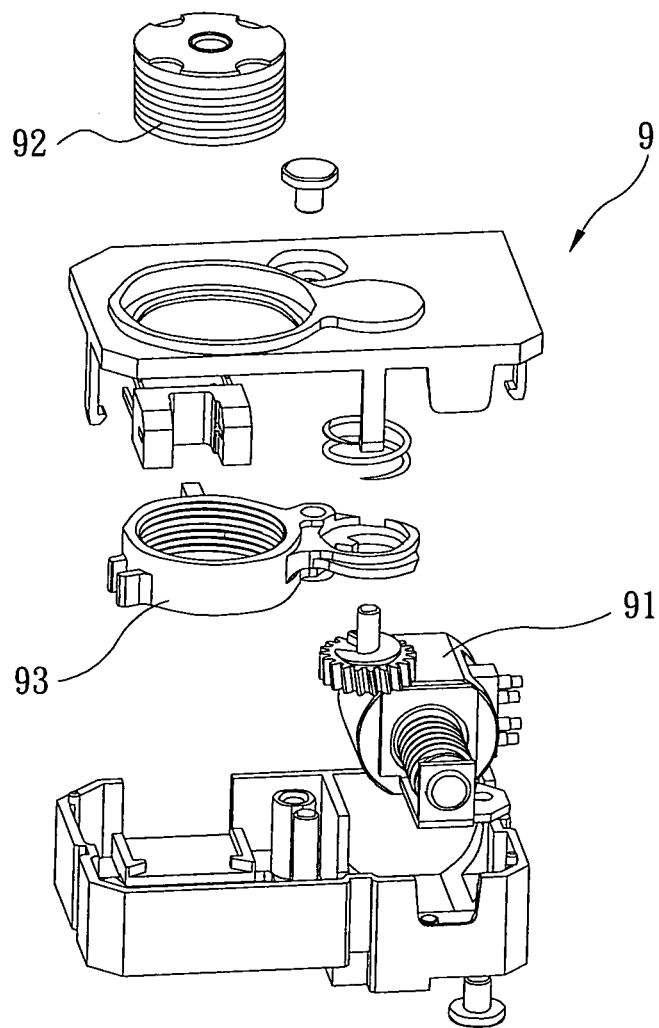
FIG. 1 is an exploded perspective view of a conventional focusing lens unit.
Figure 2:
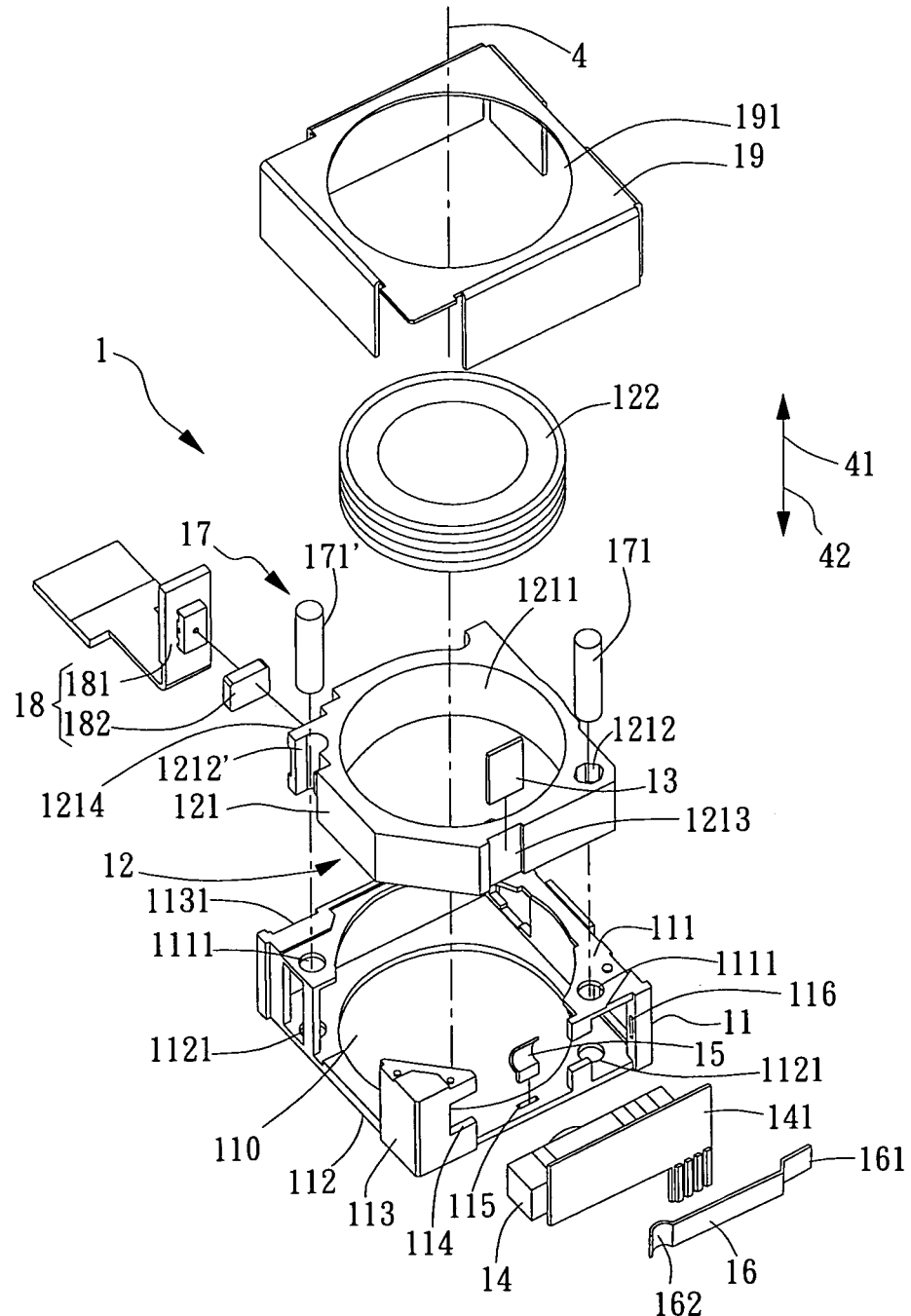
FIG. 2 is an exploded perspective view of a piezoelectric driving module for lens in accordance with the present invention.
Figure 3:
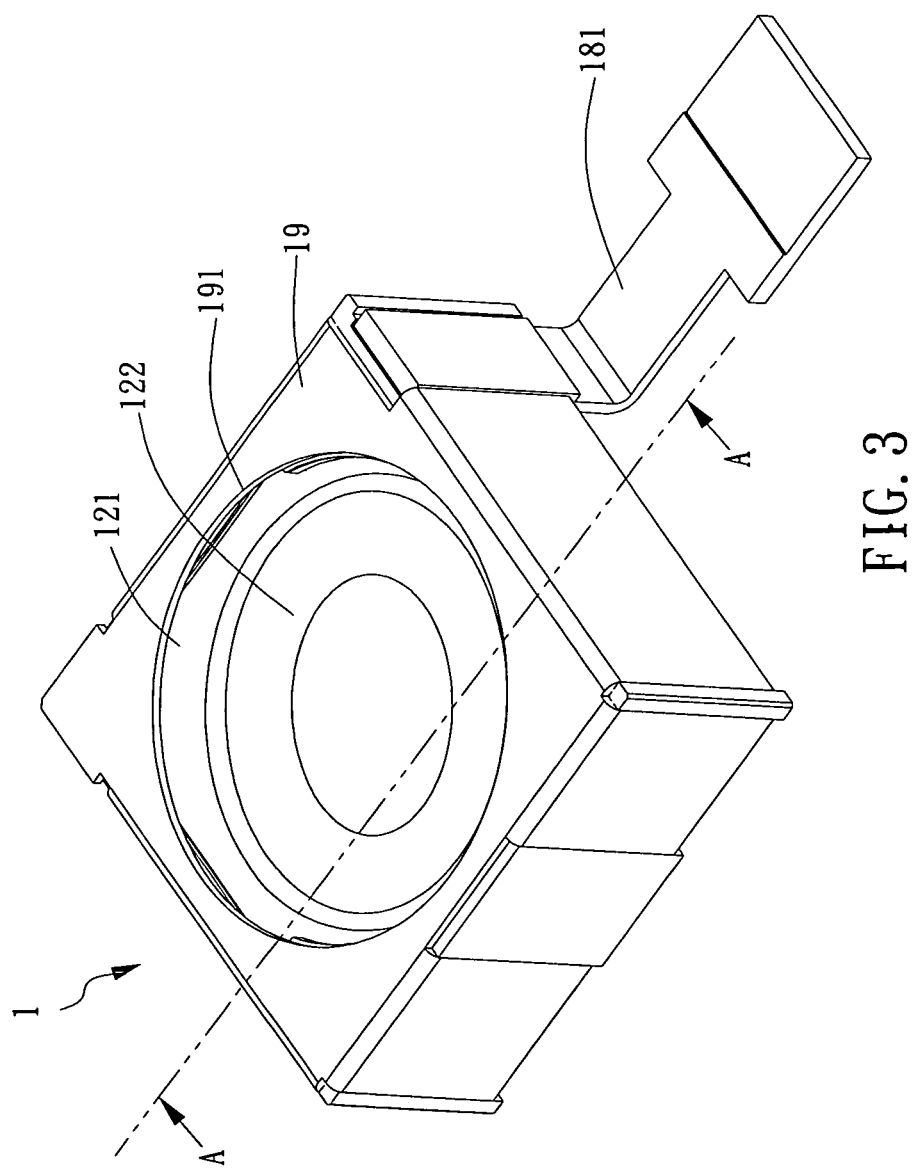
FIG. 3 is an assembled perspective view of the piezoelectric driving module for lens depicted in FIG. 2.
Figure 4:
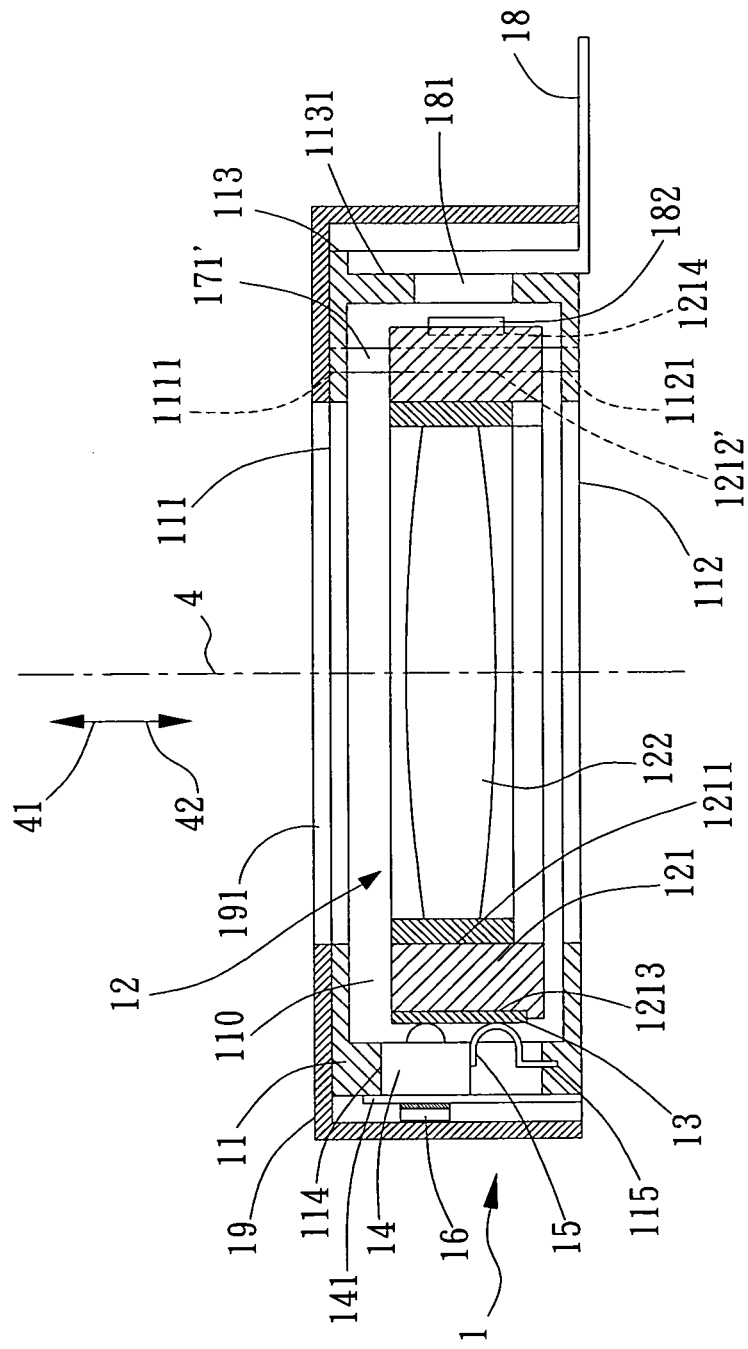
FIG. 4 is a sectional view taken along line A-A in FIG. 3.
Figure 5:
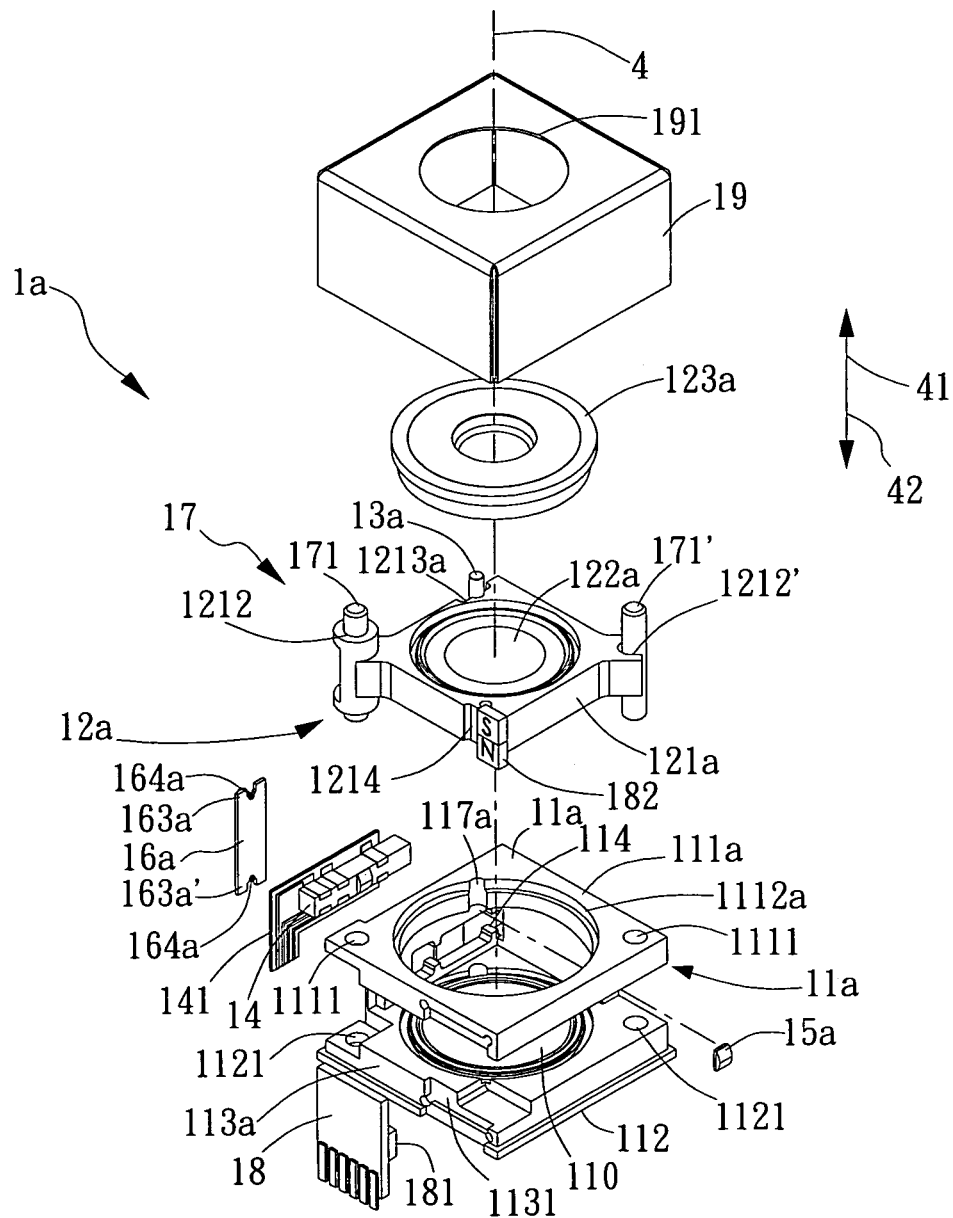
FIG. 5 is an exploded perspective view of a piezoelectric driving module for lens according to a preferred embodiment of the present invention.
Figure 6:
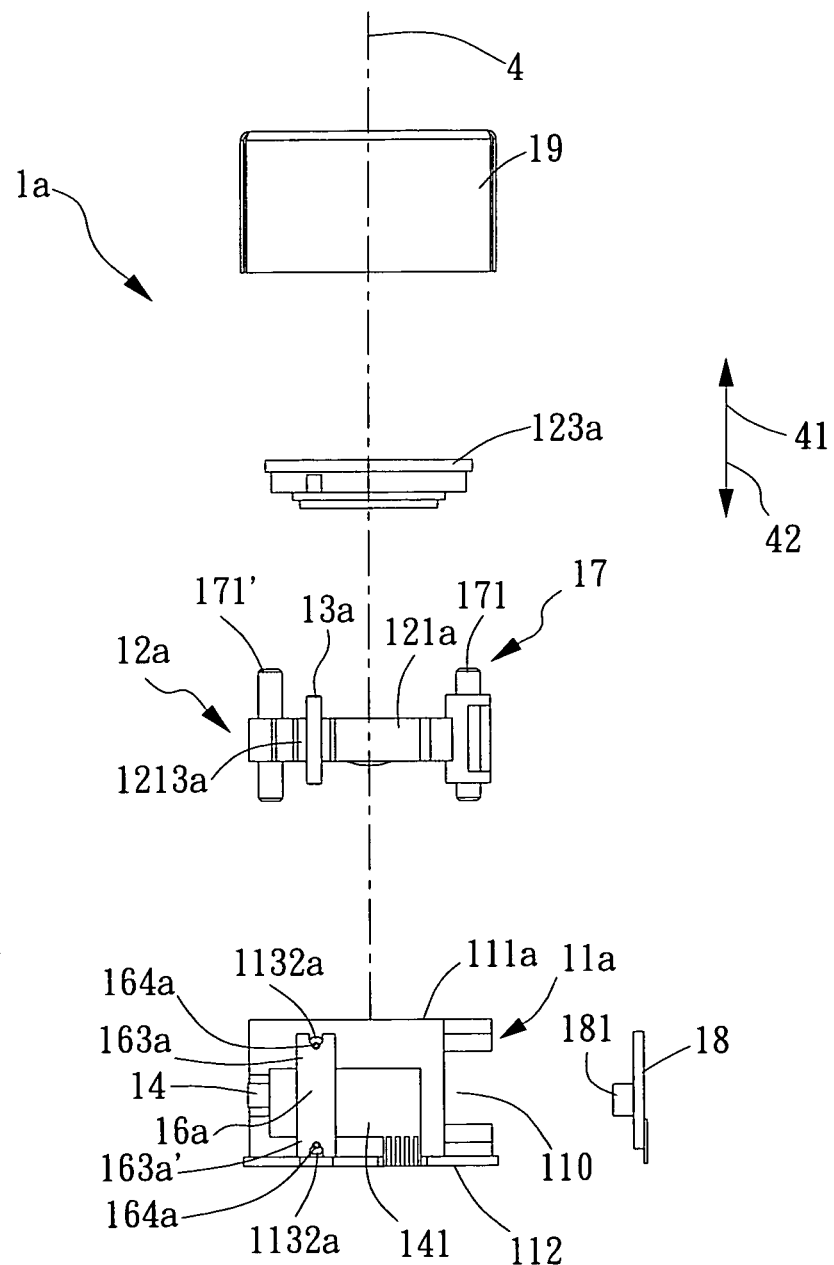
FIG. 6 is an exploded side view of the piezoelectric driving module for lens depicted in FIG. 5.
Figure 7:
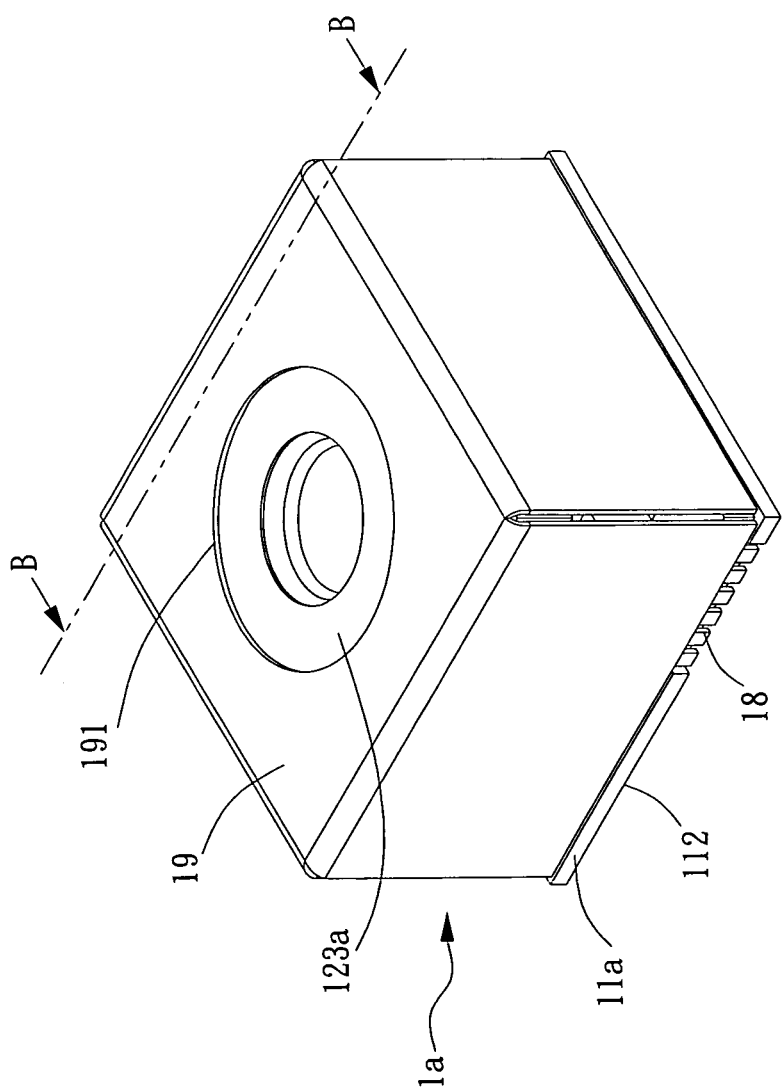
FIG. 7 is an assembled perspective view of the piezoelectric driving module for lens depicted in FIG. 5.
Figure 8:
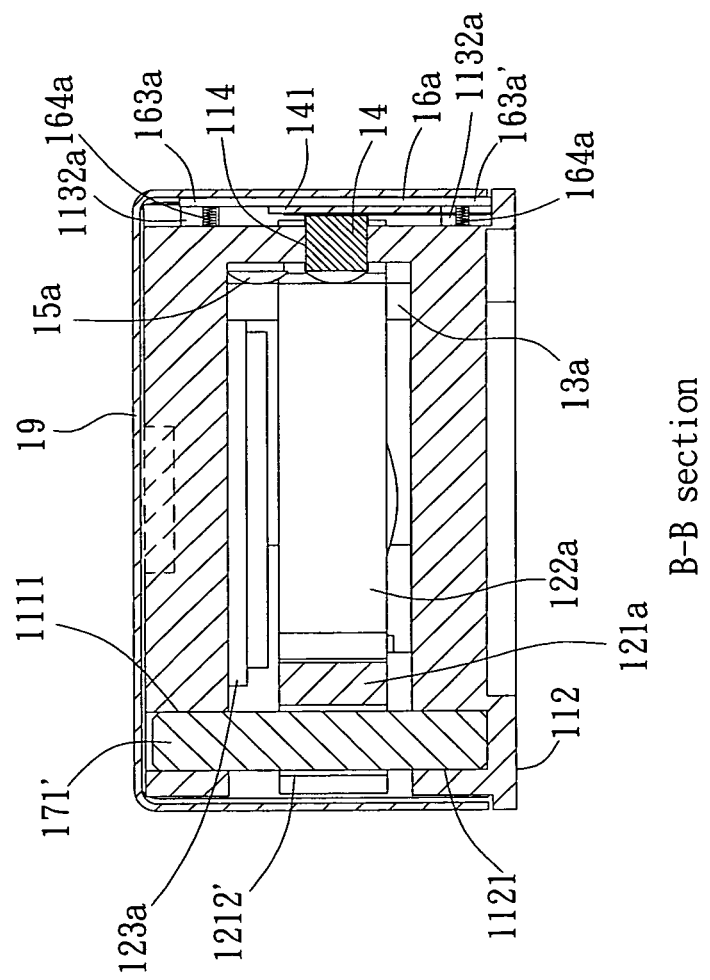
FIG. 8 is a sectional view taken along line B-B in FIG. 7.

Please refer to FIGS. 2 to 4 respectively for an exploded perspective view, an assembled perspective view, and an A-A sectional view of a piezoelectric driving module 1 for lens according to the present invention. The piezoelectric driving module 1 defines a photographic optical axis 4 and includes a housing 11, a driven object (e.g., a lens module 12), a friction element 13, at least one piezo member 14, a rubbing element 15, a pre-pressing element 16, a guiding mechanism 17, a position detection module 18, and a cover 19. The photographic optical axis 4 defines a first axial direction 41 and a second axial direction 42. The position detection module 18 includes a position sensor 181 and a permanent magnet 182.

The housing 11 is substantially a hollow housing structure penetrated by a through hole and having a receiving space 110 therein. The housing 11 further has a top surface 111, a bottom surface 112, an outer lateral surface 113, a fixing groove 114, a first engaging slot 115, and a second engaging slot 116. In this embodiment of the present invention, the driven object is a lens module 12, which can be either a zoom lens module or a focusing lens module. The lens module 12 includes a lens seat 121 and a lens 122. The lens 122 is set in a setting area 1211 at the center of the lens seat 121 so as to enable synchronous displacement of the lens 122 and the lens seat 121. Besides, the outer periphery of the lens seat 121 is provided with a first connecting groove 1213 and a second connecting groove 1214.

In this embodiment, the at least one piezo member 14 is provided on the housing 11 and adjacent to a first lateral surface of the lens module 12 (i.e., the driven object). The first connecting groove 1213 is located on a second lateral surface of the lens seat 121 (i.e., of the lens module 12), and the second connecting groove 1214 is located on a lateral surface of the lens seat 121 (i.e., of the lens module 12) that is opposite the second lateral surface. While the second lateral surface in this embodiment coincides with the first lateral surface, they can be different lateral surfaces in a different embodiment of the present invention. The photographic optical axis 4 is parallel to the first lateral surface and the second lateral surface.

The lens module 12 is received in the receiving space 110 in such a way that the centerline of the lens module 12 is kept aligned with the photographic optical axis 4 by the guiding mechanism 17. The guiding mechanism 17 also allows the lens module 12 to move linearly along the photographic optical axis 4 to a limited extent and prevents the lens module 12 from rotation. The friction element 13 is provided on the lens seat 121 and fixed in the first connecting groove 1213, so as for the piezo member 14 and the rubbing element 15 to rub against the friction element 13 respectively. In particular, the rubbing element 15 is substantially located on the housing 11 and adjacent to the friction element 13 provided on the second lateral surface of the lens seat 121 of the lens module 12 (i.e., the driven object).

In this embodiment of the present invention, the piezo member 14 is a piezoelectric motor provided in the fixing groove 114 of the housing 11 and pressed against the friction element 13 on the lens module 12. The piezoelectric motor, whose operating frequency can be set at 120 KHz, is configured for driving the lens module 12 to move in the receiving space 110 along the first axial direction 41 and the second axial direction 42 of the photographic optical axis 4. Further, the piezo member 14 is electrically connected to a circuit board 141. When a predetermined voltage is applied through the circuit board 141 to the piezo member 14, the piezoelectric motor produces a piezoelectric effect and drives the lens module 12 by friction, causing linear displacements of the lens module 12 in the first axial direction 41 and the second axial direction 42. Thus, the piezoelectric driving module 1 provides a zooming or focusing function.

Due to the force of gravity acting on the lens module 12, and were it not for the uniquely designed rubbing element 15 of the present invention, the speed at which the lens module 12 is displaced by the piezo member 14 in the first axial direction 41 might be different from the speed at which the lens module 12 is displaced in the second axial direction 42 during the zooming or focusing process; should such a speed difference occur, image quality will become instable. For example, when the piezoelectric driving module 1 is directed upward (as in a low-angle shot) or downward (as in a high-angle shot) in order to capture external images, the lens module 12 under the influence of gravity is very likely to move faster in one of the first axial direction 41 and the second axial direction 42 that coincides with the direction of the force of gravity, but for the rubbing element 15. More particularly, when the top surface 111 of the housing 11 of the piezoelectric driving module 1 faces upward (as in a low-angle shot, thus bringing the second axial direction 42 generally in line with the direction of gravity), the speed S2 at which the piezo member 14 drives the lens module 12 along the second axial direction 42 could be up to 1.7 times as high as the speed S1 at which the piezo member 14 drives the lens module 12 along the first axial direction 41, if the rubbing element 15 did not exist. Conversely, when the top surface 111 of the housing 11 of the piezoelectric driving module 1 faces downward (as in a high-angle show, thus bringing the first axial direction 41 generally in line with the direction of gravity), the speed S1 at which the piezo member 14 drives the lens module 12 along the first axial direction 41 could be up to 1.7 times as high as the speed S2 at which the piezo member 14 drives the lens module 12 along the second axial direction 42, in the absence of the rubbing element 15.

The uniquely designed rubbing element 15 of the present invention is positioned in the first engaging slot 115 of the housing 11 and presses against the friction element 13 on the lens module 12. Therefore, when the lens module 12 is moved, a frictional force is generated between the rubbing element 15 and the friction element 13. Because of the rubbing element 15, the ratio between the speed S1 at which the piezo member 14 drives the lens module 12 along the first axial direction 41 and the speed S2 at which the piezo member 14 drives the lens module 12 along the second axial direction 42 can be controlled to be within 1:1.3 or 1.3:1, regardless of whether the first axial direction 41 or the second axial direction 42 is closer to the direction of the force of gravity. The rubbing element 15 has a resilient force that keeps the rubbing element 15 in contact with the friction element 13 so as to facilitate generation of the aforesaid frictional force. In moments when the actuating force applied by the piezo member 14 to the lens module 12 is relatively small, the aforesaid frictional force can reduce the gravity-induced speed difference of the lens module 12, thus allowing the piezo member 14 of the piezoelectric driving module 1 to drive the lens module 12 back and forth more stably in the first axial direction 41 and the second axial direction 42 of the photographic optical axis 4.

The pre-pressing element 16 is provided on the housing 11 and situated between the cover 19 and the piezo member 14, i.e., generally behind the piezo member 14, so as to apply a pre-pressing force to the piezo member 14. The pre-pressing element 16 has a fixed end 161 engaged in the second engaging slot 116 of the housing 11. The other end of the pre-pressing element 16 is a pressing end 162 formed as a curved projection for applying a resilient pre-pressing force to the back of the piezo member 14, with a view to increasing the frictional force between the lens module 12 and the piezo member 14. The guiding mechanism 17 includes two guide posts 171, 171' and is hereinafter also referred to as the guide posts. The guide posts 171, 171' are respectively received in a guide hole 1212 and a guide groove 1212' diagonally formed on the lens seat 121. In this embodiment of the present invention, both the rubbing element 15 and the pre-pressing element 16 are resilient metal plates.

In order to enable linear axial movement of the lens module 12 within the receiving space 110, the guiding mechanism 17 in this embodiment is connected to and extends across the housing 11. The guiding mechanism 17 of the present invention at least includes one of the following: a guide post and a guide rail. In this embodiment for example, the guiding mechanism 17 is composed of the two slender guide posts 171, 171' and the pre-formed guide hole 1212 and guide groove 1212' that penetrate the lens seat 121. The upper and lower ends of each guide post 171, 171' are fixed to connecting ends 1111, 1121 provided on the top surface 111 and the bottom surface 112 of the housing 11 respectively. Thus, the guide posts 171, 171' form axial rails which extend across the receiving space 110 and are parallel to the photographic optical axis 4 and on which the lens seat 121 can be mounted through the guide hole 1212 and the guide groove 1212'. Thanks to the guide posts 171, 171', the piezo member 14 when subjected to an applied voltage can drive the lens seat 121 linearly and stably back and forth along the first and the second axial directions 41, 42 of the photographic optical axis 4 inside the receiving space 110, without any rotation.

The position detection module 18 may include a magnetic sensing element that provides a magnetic sensing function, as is the case of the present embodiment. The magnetic sensing element can detect the variation of the magnetic force of a magnet so as to calculate the displacements of the lens module 12 along the first and the second axial directions 41, 42, thereby determining the relative positions of the lens module 12 and the housing 11. In this embodiment of the present invention, the position sensor 181 is connected to the outer lateral surface 113 of the housing 11, fits in a first recess 1131, and corresponds in position to the permanent magnet 182 provided in the second connecting groove 1214 on the outer periphery of the lens module 12. The position sensor 181 is configured for sensing the displacements of the lens module 12 in the receiving space 110 of the housing 11.

In a different embodiment, the position detection module 18 includes a light-emitting element and a light-receiving element that enable position detection by optical means. In addition, a light-reflecting surface is provided on the outer periphery of the lens module 12 and corresponds in position to the position detection module 18, so that light emitted by the light-emitting element is reflected by the light-reflecting surface and then received by the light-receiving element. Based on variation of the received light, the displacements of the lens module 12 in the first and the second axial directions 41, 42 can be calculated.

The cover 19 is a hollow cover having a through hole 191 and designed to cover and connect with the housing 11. By means of the cover 19, the lens module 12 is positioned in the receiving space 110, and the position of the pre-pressing element 16 is limited in relation to the housing 11. More particularly, once the cover 19 is connected to the housing 11, the pre-pressing element 16 is limited by the cover 19 and therefore stays between the cover 19 and the housing 11. At the same time, the through hole 191 provides an opening through which the lens module 12 in the receiving space 110 can capture external images.

Presented below is a preferred embodiment of the present invention, in which most of the components and structures are identical or similar to those in the foregoing embodiment and therefore will not be described repeatedly. The identical components are given the same names and reference numerals. Similar components are designated the same names but are differentiated from each other by an English letter suffixed to the reference numerals used in the preferred embodiment.

FIGS. 5 through 8 are an exploded perspective view, an exploded side view, an assembled perspective view, and a B-B sectional view of a piezoelectric driving module for lens according to the preferred embodiment of the present invention. The preferred embodiment shown in FIGS. 5 to 8 is substantially similar to the embodiment shown in FIGS. 2 to 4; hence, for the sake of simplicity, all those identical components and structures will not be further described.

The preferred embodiment is different from the previous embodiment in that the piezoelectric driving module 1a in the preferred embodiment has a cylindrical friction element 13a which is provided in the first connecting groove 1213a and can move synchronously with the lens seat 121a along the photographic optical axis 4. The cylindrical friction element 13a provides a relatively small and generally linear contact area and therefore a more stable rubbing effect. In this preferred embodiment of the present invention, the friction element 13a is secured in the first connecting groove 1213a by adhesive bonding. The friction element 13a can move linearly along a slide rail 117a on the inner periphery of the housing 11a while making linear contact with the piezo member 14 and the rubbing element 15a, wherein the slide rail 117a is formed as a groove having a semicircular cross-section. The friction element 13a can be made of metal or ceramic to reduce wear and tear resulting from frictional contact with the piezo member 14.

The rubbing element 15a is bonded to the inner periphery of the housing 11a and located on one lateral side of the piezo member 14 so as to contact with the friction element 13a and thereby produce a predetermined frictional force. The pre-pressing element 16a, which is a metal plate disposed behind the piezo member 14, has two end portions 163a, 163a' each provided with a resilient member 164a. The two resilient members 164a are respectively and resiliently fitted in two second recesses 1132a on the outer lateral surface 113a, thus allowing the pre-pressing element 16a to apply a predetermined pressing force to the back of the piezo member 14 to ensure constant contact between the piezo member 14 and the friction element 13a.

Furthermore, the through hole on the top surface 111a of the housing 11a is circumferentially provided with a step-like engaging portion 1112a for engaging with another lens set 123a. This lens set 123a is centered on the photographic optical axis 4 and corresponds in position to the lens module 12a in the housing 11a. The piezo member 14 can drive the lens module 12a and thereby adjust the distance between the lens 122a and the lens set 123a, so as for the piezoelectric driving module 1a to produce a zooming or focusing effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A piezoelectric driving module for lens, defining a photographic optical axis and comprising:
    a housing having a receiving space therein;
    a driven object received in the receiving space;
    at least a piezo member provided on the housing and adjacent to a first lateral surface of the driven object;
    a rubbing element provided on the housing and adjacent to a second lateral surface of the driven object, wherein the second lateral surface may or may not coincide with the first lateral surface, and the photographic optical axis is parallel to the first lateral surface and the second lateral surface; wherein when a voltage is applied to the at least a piezo member, the at least a piezo member drives the driven object to move along the photographic optical axis such that a predetermined frictional force is generated between the rubbing element and the driven object to reduce a speed difference of the driven object that results from a force of gravity acting on the driven object while the driven object is moved;
    a pre-pressing element provided on the housing so as to apply a pre-pressing force to the at least a piezo member and thereby keep the at least a piezo member in contact with the driven object; and
    a cover for positioning the driven object in the receiving space and limiting a position of the pre-pressing element with respect to the housing;
    wherein the pre-pressing element is a metal plate provided behind the at least a piezo member, and the pre-pressing element has two end portions each provided with a resilient member, the two resilient members being respectively and resiliently fitted in two recesses on an outer lateral surface of the housing so as for the pre-pressing element to apply a predetermined pressing force to a back of the at least a piezo member to ensure constant contact between the at least a piezo member and the driven object.

2. The piezoelectric driving module of claim 1, wherein a ratio of speeds at which the driven object is moved in one direction and an opposite direction of the photographic optical axis respectively is controlled to be within 1:1.3.

3. The piezoelectric driving module of claim 1, wherein each said piezo member is a piezoelectric motor, and the driven object is a lens module selected from the group consisting of a zoom lens module and a focusing lens module.

4. The piezoelectric driving module of claim 1, further comprising at least a position detection module, wherein the at least a position detection module is provided on the housing and configured for detecting an extent to which the driven object is moved along the photographic optical axis.

5. The piezoelectric driving module of claim 1, further comprising a guiding mechanism connected to the driven object, located in the receiving space, and configured for guiding the driven object along the photographic optical axis, wherein the guiding mechanism comprises one of a guide post and a guide rail.

6. The piezoelectric driving module of claim 1, further comprising a friction element provided on the driven object so that at least a piezo member and the rubbing element can rub against the friction element.

7. The piezoelectric driving module of claim 6, wherein the friction element is cylindrical, is secured in a connecting groove of the driven object by adhesive bonding, is movable along a slide rail formed as a semicircular groove on an inner periphery of the housing so as to move linearly along the photographic optical axis in synchronization with the driven object, and is in contact with the at least a piezo member and the rubbing element.

8. The piezoelectric driving module of claim 6, wherein the friction element is made of metal or ceramic, is bonded to an inner periphery of the housing, is located on a lateral side of the at least a piezo member, and is in contact with the rubbing element so as to generate the predetermined frictional force.

* * * * *